2,816,845
Patented Dec. 17, 1957

2,816,845

PETROLEUM WAX COMPOSITIONS

Robert G. Capell, Pittsburgh, and Philip R. Templin, Oakmont, Pa., assignors to Gulf Research & Development Company, Pittsburgh, Pa., a corporation of Delaware No Drawing. Application June 13, 1955,
Serial No. 515,224

2 Claims. (Cl. 106—270)

This invention relates to amorphous petroleum wax compositions, and it is concerned with the stabilization of such wax compositions against darkening in color upon exposure to light.

Normally refined amorphous petroleum waxes, such as petrolatum and microcrystalline wax, have been found to be sensitive to light, and darken considerably upon continued exposure. Such darkening, which is an indication of deterioration, is undesirable. In the food packaging industry, for example, where wrapping materials such as paper are coated with thin films of film-forming compositions containing an amorphous petroleum wax, the darkening in color of the wax coated packaging detracts from sales value. Cloth, tenting materials, canvas awnings, sails, and other fabrics which have been waterproofed with microcrystalline waxes will also darken in sunlight. Stabilization against darkening in color is especially important for amorphous waxes to be used for coating white and light colored fabrics. Similarly, sales of white petrolatum, particularly for medicinal purposes, are adversely affected by darkening upon exposure to light.

We have now found that the deleterious darkening in color of a normally refined amorphous petroleum wax can be substantially retarded by the addition thereto of small amounts of dibenzalacetone. The addition of dibenzalacetone to a composition containing such an amorphous petroleum wax increases the light stability of the composition without adversely affecting the normal properties of the wax or the composition containing it.

The amorphous petroleum waxes with which this invention is concerned are represented by such materials as petrolatum and microcrystalline wax. These materials themselves are well-known in the art and as normally offered for sale have been substantially refined by conventional methods, such as treatment with clay, fuller's earth, etc., to improve their odor and color. The amorphous petroleum waxes are not color stable, however, and after exposure to ordinary daylight, even for a few days, progressively darken in color. This color darkening characteristic of amorphous petroleum waxes is in marked contrast to paraffin wax which is light stable for extended periods of time. However, the addition of even small amounts of an amorphous petroleum wax to a paraffin wax imparts to the resulting blend the light sensitivity of the amorphous wax itself. Blends of paraffin wax containing from 1 to 10 percent by weight, ordinarily from 1 to 5 percent, of microcrystalline wax, are used extensively for coating paper, the microcrystalline wax being added to confer increased flexibility and sealing strength to the paraffin wax. Such blends are also stabilized against light deterioration by the incorporation therewith of dibenzalacetone, and the invention includes stabilized compositions containing an amorphous petroleum wax, which compositions would otherwise exhibit light instability.

It is to be noted that the problem of light stabilization of amorphous petroleum waxes is not related to the stabilization of such waxes against oxidation. The usual wax antioxidants, including the butylated hydroxyanisoles, do not act as color stabilizers for amorphous petroleum waxes.

In accordance with our invention, dibenzalacetone is added to a color refined amorphous petroleum wax or a composition containing such a wax, normally subject to darkening in color upon exposure to light, in a small but sufficient amount to increase the light stability of the composition. We have found that amounts of dibenzalacetone as low as 0.02 percent by weight on the amorphous wax already exert a color stabilizing effect, and at least such an amount should generally be employed. Larger amounts, such as 0.5 percent by weight of dibenzalacetone can be employed also, but unless the exposure of the amorphous petroleum wax containing composition to light is exceptionally severe, it is ordinarily unnecessary to use more than 0.5 percent. The use of still larger amounts of the dibenzalacetone is limited by the application to which the amorphous petroleum wax composition may be put, because dibenzalacetone itself is a light yellow crystalline substance which imparts its own color to some extent to the wax compositions of the invention. Therefore, in an application where no substantial yellow color can be tolerated, it is desirable to use no more than 0.5 percent of the color stabilizing additive. It is to be noted, however, that any color imparted by the dibenzalacetone is far overshadowed by the color darkening obtained in the absence of this inhibitor. Accordingly, in an application where the initial color imparted by the use of larger amounts of dibenzalacetone than 0.5 percent can be tolerated, the advantages of the invention are fully realized.

The stabilized amorphous petroleum wax compositions of our invention are readily prepared by melting the wax composition and then dissolving the dibenzalacetone in the molten material. The composition is then solidified and packaged for distribution, or, as in the case of paper coating, the stabilized composition can be used in the molten state. In the practice of one embodiment of our invention a paraffin wax-microcrystalline wax blend, containing 3 percent by weight of the microcrystalline wax, is melted and 0.05 percent by weight of dibenzalacetone is dissolved in the molten blend. The resulting composition is light stable and is successfully used as a coating for paper milk cartons.

The following examples are further illustrative of the invention and are not intended to be limiting.

A blend of paraffin wax and and microcrystalline wax containing 97 percent of a 133° F. A. M. P. paraffin wax and 3 percent of a 165° F. melting point (ASTM D 127–49) microcrystalline wax was compounded with varying amounts of dibenzalacetone by dissolving the latter in the molten wax and then molding the compositions into blocks of the approximate dimensions 2 x 6 x 6 inches. A blend containing no dibenzalacetone was employed as a control. Light stability was tested as follows. One-half (½) of each test block was covered with aluminum foil and then exposed to a General Electric sun lamp (RS 275 Watt) at a distance of 15 inches for a period of 5 hours. At the end of 5 hours the aluminum foil was removed and the exposed portion of the wax was examined for discoloration and odor. In making the odor test, some wax is shaved from the exposed portion, crumbled between the fingers and the odor is noted. The results of the tests are shown in Table I.

TABLE I

| Example | Concentration of Dibenzalacetone, percent by Wt. | Discoloration | Odor |
|---|---|---|---|
| 1 | 0 | Severe | Slight. |
| 2 | 0.01 | do | Moderate. |
| 3 | 0.025 | Very Slight | None. |
| 4 | 0.05 | do | Do. |
| 5 | 0.10 | do | Do. |
| 6 | 0.25 | do | Do. |
| 7 | 0.50 | do | Do. |

As shown in examples 1 and 2 of the above table, severe discoloration was obtained with the wax blend of the tests when no dibenzalacetone or when 0.01 percent was present. The succeeding examples show that, when as little as 0.025 percent of dibenzalacetone was added, the blend discolored very slightly and had no odor. Example 1 also shows the severity of the problem, only 3 percent of microcrystalline wax contributing light instability to 97 percent of paraffin wax.

In other tests, amorphous petroleum waxes containing varying amounts of inhibitor were exposed to natural diffused light on a window sill for a period of several days. In one series of tests commercial white petrolatum was employed. In the other series, a microcrystalline wax having a melting point of about 160° F. was employed. In each series, weighed amounts of dibenzalacetone were dissolved in the molten amorphous wax, one ounce salve containers were half filled with the molten blends, the blends were allowed to solidify, and were then exposed to natural diffused daylight on the window sill. In each series of tests, two controls containing no inhibitor were employed. In the first control, the amorphous wax was not exposed to light, whereas in the second control the amorphous wax was exposed to light for the full period of the test. The results are shown in Tables II and III, Table II showing the results for the petrolatum and Table III for the microcrystalline wax.

TABLE II

| Example | Concentration of Dibenzalacetone, percent by Wt. | Time Exposed, Days | | | | | | | |
|---|---|---|---|---|---|---|---|---|---|
| | | 1 | 2 | 3 | 4 | 5 | 6 | 7 | 8 |
| 1 (Control, Darkness) | 0 | N. C. | N. C. | N. C. | N. C. | N. C. | N. C. | N. C. | N. C. |
| 2 | 0 | N. C.[1] | N. C. | S. D.[2] | S. D. | | | | C. D.[3] |
| 3 | 0.05 | N. C. | N. C. | N. C. | | | | | S. D. |
| 4 | 0.50 | N. C. | N. C. | N. C. | | | | | N. C. |

[1] N. C.=no change.
[2] S. D.=slight discoloration.
[3] C. D.=considerable discoloration.

TABLE III

| Example | Concentration of Dibenzalacetone, percent by Wt. | Time Exposed, Days | | | | | | | |
|---|---|---|---|---|---|---|---|---|---|
| | | 1 | 2 | 3 | 4 | 5 | 6 | 7 | 8 |
| 1 (Control, Darkness) | 0 | N. C. | N. C. | N. C. | N. C. | N. C. | N. C. | N. C. | N. C. |
| 2 | 0 | N. C.[1] | N. C. | N. C. | S. D.[2] | | | | C. D.[3] |
| 3 | 0.05 | N. C. | N. C. | N. C. | | | | | N. C. |
| 4 | 0.50 | N. C. | N. C. | N. C. | | | | | N. C. |

[1] N. C.=no change.
[2] S. D.=slight discoloration.
[3] C. D.=considerable discoloration.

The above tables show that the addition of as little as 0.05 percent of dibenzalacetone either to petrolatum or microcrystalline wax substantially retards discoloration by light. The tables also show, comparing examples 1 and 2 of each table, that only 3 or 4 days exposure of the uninhibited material to daylight results in the beginning of color darkening.

It will be understood by those skilled in the art that the amorphous petroleum wax compositions of this invention can contain other modifying agents in addition to dibenzalacetone. For example, known wax antioxidants, dyes, other film-forming materials, polyethylene, polyisobutylene, animal and vegetable waxes, and the like, can be added without departing from the spirit of the invention.

Resort may be had to such modifications and variations as fall within the spirit of the invention and the scope of the appended claims.

We claim:

1. A petroleum wax composition stabilized against discoloration by light consisting essentially of a major amount of paraffin wax, from 1 to 10 percent by weight of microcrystalline wax, and from about 0.02 to 0.5 percent by weight of dibenzalacetone.

2. The composition of claim 1 wherein the microcrystalline wax is present in an amount of from 1 to 5 percent by weight.

(References on following page)

References Cited in the file of this patent

UNITED STATES PATENTS

| | | |
|---|---|---|
| 2,299,951 | Ingle | Oct. 27, 1942 |
| 2,443,221 | Bergstein | June 15, 1948 |
| 2,646,362 | Capell | July 21, 1953 |
| 2,730,452 | Johnston et al. | Jan. 10, 1956 |
| 2,755,193 | Rumberger | July 17, 1956 |

FOREIGN PATENTS

| | | |
|---|---|---|
| 541,638 | Britain | Dec. 4, 1941 |

OTHER REFERENCES

Chemical Zeitung, 65 pages, 293–5 (1941).
Arch. Pharm., 280 pages, 373–86 (1944).